(No Model.)

I. McCOLLISTER & B. F. RENNERD.
REEL FOR CORN HARVESTERS.

No. 435,238. Patented Aug. 26, 1890.

WITNESSES:
Friedrich Kirsch
Ebenezer K. Hood

INVENTORS.
Irvin McCollister
Benjamin F. Rennerd

UNITED STATES PATENT OFFICE.

IRVIN McCOLLISTER AND BENJAMIN F. RENNERD, OF CHILLICOTHE, OHIO.

REEL FOR CORN-HARVESTERS.

SPECIFICATION forming part of Letters Patent No. 435,238, dated August 26, 1890.

Application filed December 23, 1889. Serial No. 334,625. (No model.)

*To all whom it may concern:*

Be it known that we, IRVIN McCOLLISTER and BENJAMIN F. RENNERD, of Chillicothe, in the county of Ross, State of Ohio, have invented certain new and useful Improvements in Corn-Harvesters, of which the following is a specification, reference being had to the accompanying drawings.

The object of our invention is to produce a cheap and comparatively simple machine for harvesting corn, and one which is adapted to take up the stalks that have been thrown down, so that none of the work has to be done by hand.

Figure 2:
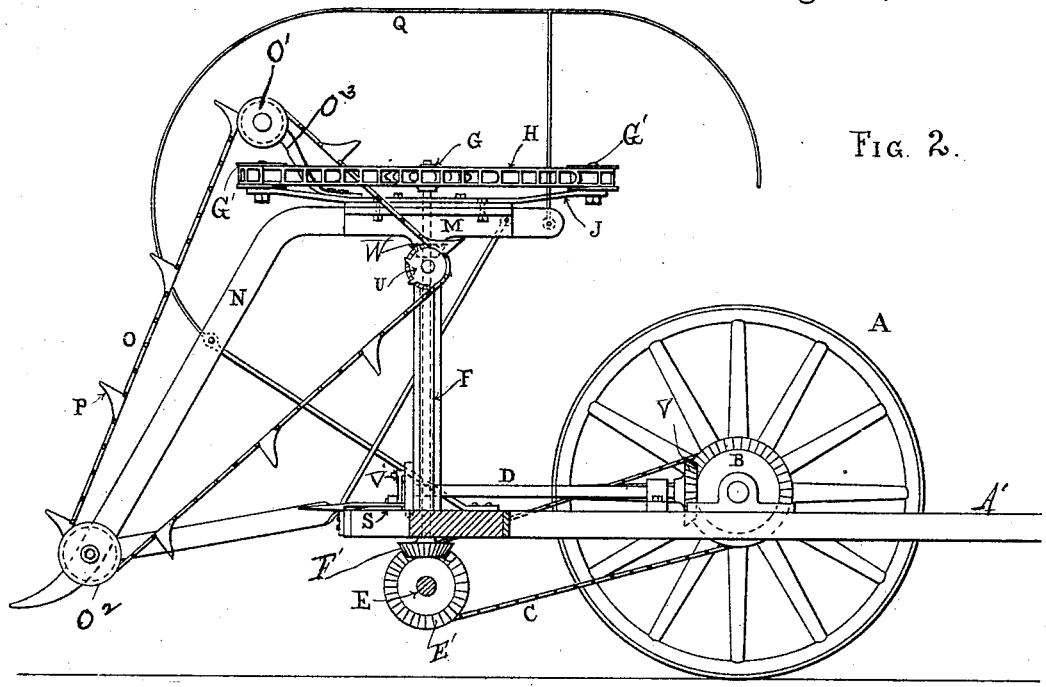
Figure 1:
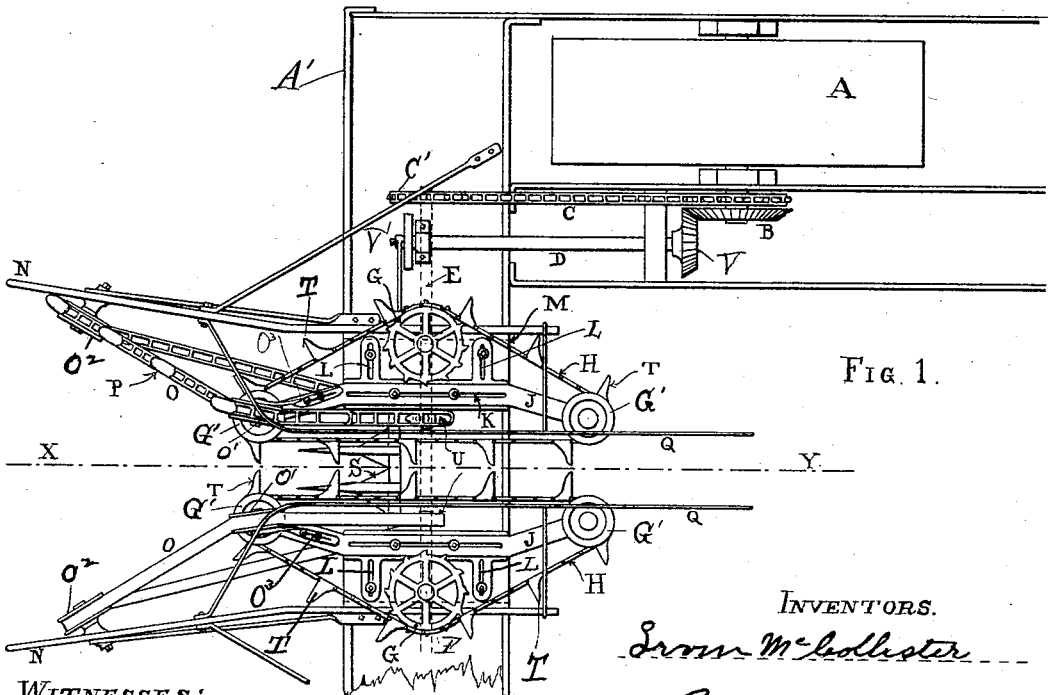

In the accompanying drawings, Figure 1 is a top plan view of our machine with one of the side wheels broken away. Fig. 2 is a vertical section along the line $x\,y$ of Fig. 1.

Referring to letters on the drawings, A indicates the driving-wheel of the machine. It is carried upon one side of the frame A' of the machine. The frame is supported by another wheel upon its opposite side; but this wheel, being of ordinary construction and being in no manner related to our invention, is not shown in the drawings.

To the axle of the wheel A is secured a combined sprocket and bevel geared wheel B. The sprocket-wheel B, by means of the sprocket-band C, communicates motion through the sprocket-wheel C' to the shaft E.

Secured to the shaft E are two bevel-wheels E', that communicate motion from the shaft E through each of the bevel-wheels F' to the vertical shafts F. Upon the head of each of these shafts is secured a sprocket-wheel G, around which passes the sprocket-band H. G' indicate guide-wheels for each of the bands H. These wheels are borne upon frames J, that are inwardly and outwardly and longitudinally adjustable by means of nuts and bolts working in the slots K and L, respectively.

M indicates the frames upon which are borne the frames J. By means of the inward and outward adjustment of the frames J upon the frames M the distance between the bands H may be varied at will.

T indicates projections borne at short intervals upon the bands H. By means of said projections the stalks of corn, as the machine is drawn along a row, (represented by the line $x\,y$,) are caught and carried against the knives S, which sever them from the ground. The stalks after they are severed from the ground are borne backward by the band H between the guides Q until they drop clear of the machine.

The longitudinal adjustment of the frames J upon the frame M affords means for regulating the relative positions of the different parts carried by the frames J.

The knives S (illustrated in the drawings) are of the ordinary reciprocating kind, and are driven by the bevel-gear B through the spur-gear V, shaft D, and crank V'. Any suitable form of mechanism may be employed for operating the knives S.

Upon the shafts F, below the sprocket-wheels G, are secured beveled gear-wheels W, that mesh with a bevel-gear upon the shaft of the sprocket-wheels U, that drive the band O.

O' indicates guide-wheels borne upon the frames J, and O² corresponding guide-wheels borne upon the projecting arm N of the frame M. Each of the bands O passes around one of the wheels U, O', and O², in the manner illustrated in the drawings.

O³ indicates bracket-arms adjustably borne on the frames J, whereby the wheels O' may be adjusted to suit the adjustment of the frames J. If it were not for the adjustability of these arms a change of position of the frames J would interfere with the operation of the band O; but by the aid of them this difficulty is avoided.

P indicates projections upon the bands O, which catch and pick up fallen stalks that lie in the way of the machine. After they have been caught by the projections P the stalks are lifted up the incline of the band O until they reach the band H, when they have attained an upright position, and are then in proper relation to the knives to be cut by them.

What we claim is—

In a corn-harvester, the combination, with the main frame of the machine and frames M borne thereon, of the frames J, adjustably borne upon the frames M, the sprocket-bands H, operatively carried upon the frames J, the
5 bands O, and wheels $O^2$, U, and O', the wheels O' being carried upon the frames J by means of the adjustable bracket-arms $O^3$, whereby the tension of the bands O may be regulated to suit the adjustment of the bands H, substantially as set forth.

IRVIN McCOLLISTER.
    BENJAMIN F. RENNERD.

Witnesses:
 FREDRICK KIRSCH,
 EBENEZER K. HOOD.